(No Model.)
C. W. SNEDEKER.
DRAFT YOKE.
No. 479,535. Patented July 26, 1892.
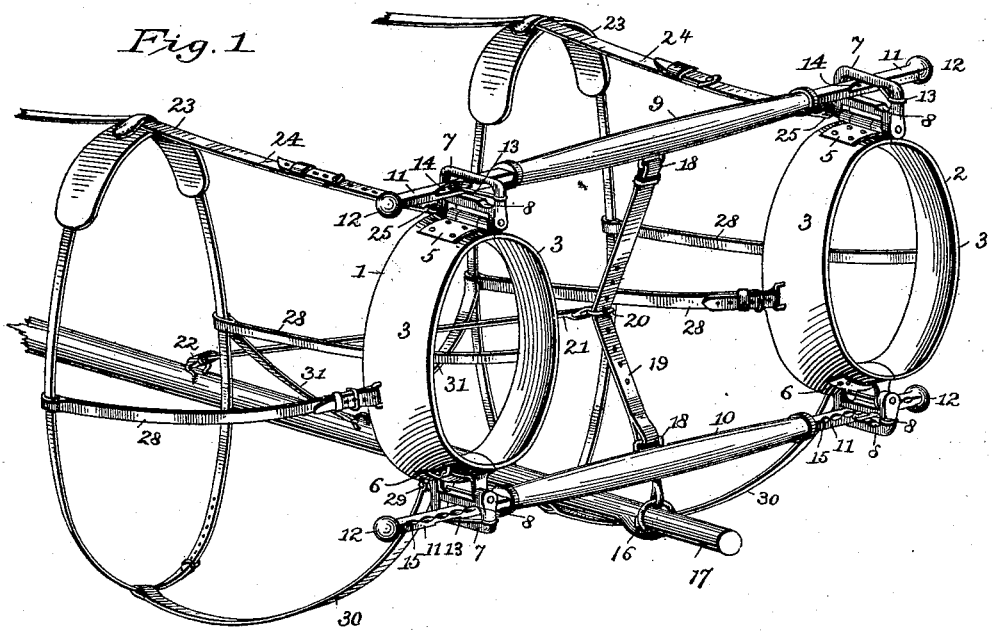
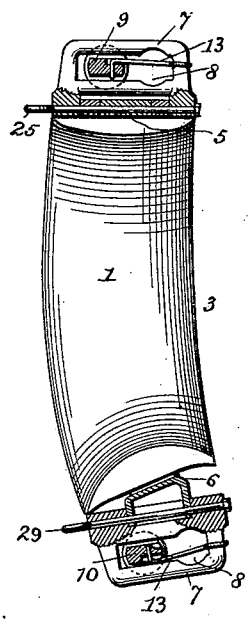
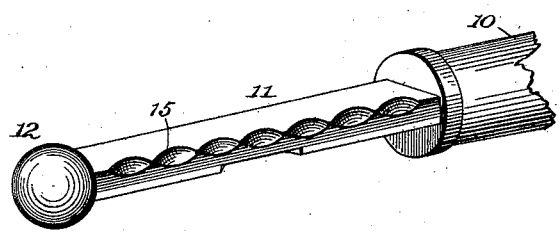
Witnesses:
Chas H. Ourand
W. J. Duvall
Inventor
Charles W. Snedeker
By his Attorneys,
C. A. Snow & Co.

UNITED STATES PATENT OFFICE.

CHARLES W. SNEDEKER, OF MARBLETOWN, NEW YORK, ASSIGNOR OF ONE-HALF TO EDWARD W. OSTRANDER, OF SAME PLACE.

DRAFT-YOKE.

SPECIFICATION forming part of Letters Patent No. 479,535, dated July 26, 1892.

Application filed September 18, 1891. Serial No. 406,141. (No model.)

*To all whom it may concern:*

Be it known that I, CHARLES W. SNEDEKER, a citizen of the United States, residing at Marbletown, in the county of Ulster and State of New York, have invented a new and useful Draft-Yoke, of which the following is a specification.

This invention relates to improvements in draft-yokes and to that particular class thereof in which the collars are loosely connected at their upper and lower ends by transverse yoke-bars.

The objects of my invention are to provide a strong and serviceable collar of great lightness, to provide means for connecting to the same in a loose manner upper and lower yoke-bars, whereby the horses are permitted to travel at an angle to the line of draft, and yet to so connect said lower yoke-bar as to maintain an equalization of the draft when the horses are holding back, as in backing or descending a hill.

Other objects and advantages of the invention will appear in the following description, and the novel features thereof will be particularly pointed out in the claims.

Referring to the drawings, Figure 1 is a perspective of a draft-yoke constructed in accordance with my invention. Fig. 2 is a transverse section through the yoke-bars. Fig. 3 is a detail perspective of the lower yoke-bar.

Like numerals of reference indicate like parts in all the figures of the drawings.

1 and 2 designate a pair of collars, said collars being convexed upon their inner sides and concaved upon their outer sides and are formed of light sheet-steel or other suitable metal. In constructing the collars I form each in two halves or sections 3, the collars being vertically divided for that purpose. At their upper ends the sections are connected by a suitable hinge 5, while at their lower ends they are separably connected by a fastener 6. The collars are thus adapted to separate to permit readily of their introduction over a horse's head. Upon the upper and lower ends of the collars and transversely disposed are located keepers 7, said keepers being formed integral with the collars or secured thereto in any suitable manner. The transverse edges of the loops or eyes of the keepers are near their front ends provided with semicircular notches 8.

9 and 10 designate the upper and lower yoke-bars, respectively, which yoke-bars are cylindrical near their middles and from points equidistant from the centers thereof to near their ends are reduced or flattened, as at 11, so that they are oblong in cross-section, while the extremities of said bars are provided with enlargements or heads 12. In introducing these bars into the keepers the enlargements or heads are passed through the notches formed in the edges of the eyes of the keepers, and as said eyes are but slightly larger than the reduced portions of the bars a loose connection is made and yet one which will not permit of any disconnection of the bars and keepers except opposite the notches. Hooks 13 are swiveled for lateral movement upon the front end of each of the keepers, and the rear hooked ends thereof are removably engaged with any one of a series of perforations 14, formed in the front edge of each bar near its extremity. These hooks give the collars the proper spacing apart and by reason of their swiveling permit of a reciprocation upon the part of the yoke-bars in their keepers. The lower yoke-bar is provided at its reduced portion and upon its upper front corner with a succession of rounded notches 15, and at its center the said yoke-bar is provided with the usual pole-receiving eye 16, which receives the end of the draft-pole 17 when a draft-pole is used. By the provision of these notches it will be seen that when in the act of backing or holding back, as in descending a hill and the lower yoke-bar is by the pole partially rotated, the same will be rotated into engagement with the upper edges of their respective keepers and be thus locked against any longitudinal movement in said keepers. By such an arrangement the equalization of the draft is preserved and no sliding of the yoke-bar from the collar of one horse to that of the other and consequent shifting of the draft can take place.

Eyes 18 are located at the centers of the two yoke-bars, and in the same are loosely connected the ends of a vertical draft-strap 19. Adjustably connected by a buckle 20 to the draft-strap is a tug-strap 21, which may extend rearwardly and connect with the load, or when a pole is used, as in the present instance, connects, as at 22, with it.

23 designates a pair of back-pads or saddles, the ends of which are provided with the usual girth-straps. A back-strap 24 is connected with the eye 25, formed at the rear end of each of the pintles of the hinges of the collar-sections, upon which pintles the keepers may, as herein shown, be pivoted, and said strap passes rearwardly and is connected with the saddle. Short tug-straps 28 connect with eyes at opposite sides of the collars and with the girth, and a short martingale 30 connects with the lower pintle-eye 29 of each collar and with the girth. Straps 31 connect with the girth at the inner sides thereof, and at their inner ends connect with an eye 32 upon the pole, thereby limiting the separation of the horses.

Having described my invention, what I claim is—

1. In a neck-yoke, the combination, with the opposite collars provided at their upper and lower sides with transverse keepers and with swiveled hooks located upon the front ends of the keepers, of upper and lower yoke-bars having their ends located in said keepers and provided with a series of perforations for engaging the hooks, a draft-strap connecting the bars, and draft devices leading from the strap, substantially as specified.

2. In a neck-yoke, the combination, with the opposite collars provided at their upper and lower ends with transverse keepers, of upper and lower yoke-bars connected together and reduced at their ends for movement within the keepers, said lower yoke-bar being provided at its edge with notches for engaging the edge of the keeper when the yoke-bar is turned, and a draft-pole-receiving eye on the center of said yoke-bar, substantially as specified.

3. The combination, with the opposite collars and their keepers, the latter provided at their opposite edges and near their front ends with recesses, of the connected draft-bars flattened near their ends to fit loosely in the keepers and at their ends provided with knobs or heads, in rear of which perforations are formed, and hooks swiveled on the front ends of the keepers and removably engaging said perforations, substantially as specified.

4. In a neck-yoke, the combination, with the opposite collar-sections, a clasp at the lower ends, and a hinge at their upper ends, the latter having a pintle, of upper keepers pivoted upon the pintles of the hinges, a lower pair of keepers pivoted to the lower ends of the collars, yoke-bars loosely connected with the keepers, and draft connections between the bars, substantially as specified.

5. In a neck-yoke, the combination, with the opposite collars provided at their upper and lower sides with transverse keepers and with swiveled hooks located upon the keepers, of upper and lower yoke-bars having their ends located in said keepers and provided with a series of perforations for engaging the hooks, substantially as specified.

In testimony that I claim the foregoing as my own I have hereto affixed my signature in the presence of two witnesses.

CHARLES W. SNEDEKER.

Witnesses:
JOHN Q. HAIT,
ISRAEL SNYDER.